United States Patent [19]

Newbould et al.

[11] 3,899,462

[45] Aug. 12, 1975

[54] REINFORCED POLYAMIDE MOLDING COMPOSITION

[75] Inventors: John Newbould, Sterling Heights; Elio Eusebi, Troy, both of Mich.; Edward G. Bobalek, Orono, Maine

[73] Assignee: General Motors Corporation, Detroit, Mich.

[22] Filed: Mar. 29, 1974

[21] Appl. No.: 456,226

[52] U.S. Cl............. 260/37 N; 106/308 M; 260/857
[51] Int. Cl.² .......................................... C08L 77/02
[58] Field of Search..................... 260/37 N, 38, 857; 117/100 S; 106/308 M

[56] References Cited
UNITED STATES PATENTS
3,458,613    7/1969    Andrews et al................... 260/38 X

OTHER PUBLICATIONS

Chemical Abstracts, Vol. 77, 153009z, Thermoplastic Materials with Resinous Fillers

*Primary Examiner*—Melvyn I. Marquis
*Assistant Examiner*—S. M. Person
*Attorney, Agent, or Firm*—George A. Grove

[57]    ABSTRACT

In a preferred embodiment a filled and reinforced polyamide composition is formed by using a resole to chemically and physically couple a particulate silica or silicate filler to the polyamide matrix. The subject coupling agents have the high temperature stability required in the processing of polyamide resins.

5 Claims, No Drawings

REINFORCED POLYAMIDE MOLDING COMPOSITION

FIELD OF THE INVENTION

This invention relates to filled and reinforced polyamide compositions and, more specifically, to the use of a resole as the means to physically and/or chemically couple a mineral filler to a polyamide matrix. The use of the subject coupling agent provides molding compositions having excellent physical properties.

BACKGROUND OF THE INVENTION

Many of the physical properties of polyamide resins can be improved by the incorporation of suitable reinforcing fillers. The key to developing such a product is to effectively link the filler to the polyamide matrix. Without this link or coupling, the addition of a filler seriously reduces the strength of the resin at relatively low concentrations.

An effective coupling agent is one that will chemically react with both the polyamide and with the inorganic fillers. Therefore, a desirable candidate must possess both a chemical moeity which is compatible with and able to interact with the polymer, and an additional and separate chemical moeity which is compatible with and able to react with a functionality on the surface of the filler.

Organosilanes have been the most attractive candidates in the development of coupling agents because of their molecular structural advantages. Reinforced polymer compositions which employ the organosilane coupling agents are described in U.S. Pat. No. 3,328,339 issued to Tierney and U.S. Pat. No. 3,419,517 issued to Hedrick. Because of the rather complicated chemical structure of the disclosed coupling agents and of organosilanes, in general, they are relatively expensive compounds. In addition to their cost there are several other disadvantages in using the organosilane coupling agents. For example, the aminosilanes present the handling problems associated with relatively nocuous, volatile liquids, and the manufacturers specifically warn the user about their irritating properties.

OBJECTS OF THE INVENTION

It is an object of this invention to provide filled and reinforced polyamide compositions wherein the reinforcing filler is coupled to the polyamide matrix by a resole, and a method of preparing such reinforced polyamides.

SUMMARY OF THE INVENTION

In accordance with a preferred embodiment of our invention, these and other objects are accomplished by first providing a mineral silica or silicate filler which has a suitable particle size and shape, and which has reactive hydroxyl functionalities on its surfaces. For example, a particulate silica having an average particle size within the range of 4 – 10 microns is suitable.

The filler particles are pretreated by thoroughly blending and coating them with from 0.3 to 2 percent by weight, based on the filler, of a resole which is the condensation polymerization reaction product formed from an excess of formaldehyde and any of (a) phenol, (b) resorcinol, or (c) a mixture of these two in any proportion. The reaction is continued until the product has a viscosity in the range of 200 to 4,000 centistokes as measured at 25° C. in a solution comprising 15 percent of commercial grade No. 30 denatured ethyl alcohol and 85 percent of the resole. Preferably, the resole is dissolved in a suitable solvent such as acetone so that it can readily be uniformly coated onto the filler particles.

The filler resole mixture is dried and then heated to a temperature of from 160° C. to 180° C. for a period ranging from 30 to 60 minutes. This process chemically bonds the resole to the filler and also continues the polymerization of the resole. The chemical bond between the filler and the resole is formed by a condensation reaction between the hydroxyl functionalities on the surface of the filler and unreacted hydroxyl groups on the resole.

The coated filler is blended with a polyamide resin and this mixture is then extruded and chopped to form a molding grade resin. Typically about 5 to 220 parts by weight of filler per 100 parts of polyamide resin are employed. In the molding composition the coated filler is apparently hydrogen bonded to the polymer matrix. These bonds complete the chemical chain between the polymer and the filler.

The high temperature stability of the subject coupling agents is a distinct advantage in polyamide compositions which require extremely high processing temperatures. The desirable properties of the disclosed reinforced polyamide composition can be seen in Table I which illustrates the physical properties of (1) the virgin nylon 6, (2) a filled composition which contains no coupling agent, (3) a filled composition which has an organosilane coupling agent, and (4) the subject composition. For this comparison the same nylon 6 resin was used in each example, and the type and amount of filler were also held constant. The compositions containing the coupling agents were prepared in accordance with the respective preferred procedures.

TABLE I

| Composition | Tensile Modulus psi × $10^{-3}$ | Tensile Strength (psi) | Elongation At Break (%) | Impact Strength ft./lbs./in. |
|---|---|---|---|---|
| Nylon 6 (Virgin) | 370 – 440 | 11,500 | — | — |
| Nylon 6 + 40% Particulate Silica Filler (No Coupling Agent) | 670 | 8,800 | 1.8 | 4.0 |
| Nylon 6 + 40% Particulate Silica Filler and Silane Coupling Agent | — | 12,109 | 5.25 | 6.3 |
| Nylon 6 + 40% Particulate Silica Filler and Subject Coupling Agent | 710 | 11,400 | 3.5 | 7.4 |

These and other objects and advantages will be better understood in view of a detailed description thereof to include specific examples.

DETAILED DESCRIPTION OF THE INVENTION

The coupling mechanism which binds the filler to the resin in the subject compositions apparently depends on the establishment of two chemical bonds. A condensation reaction between the unreacted hydroxyl groups on the resole and the hydroxyl groups on the surface of the filler forms the bond between the filler and resole. The hydroxyl groups on the surface of the filler should be capable of forming compounds such as (a) esters if reacted with organic acids, (b) ethers, if reacted with alcohols, such as glycerol, (c) carbamates, if reacted with isocyanates, or (d) a silane derivative if reacted with methyl trichlorosilane.

The bond between the filler and the coupling agent is formed during the pretreatment of the filler when it is coated with the resole and then heated. The other chemical bond, i.e., between the coupling agent and the polymer, is believed to be a hydrogen bond between the resole and the amide group on the polymer. This chemical bond is completed during the extrusion of the coated filler-polyamide mixture.

The efforts which produced this invention were directed by the above theory which is included herein to orient the reader; however, it is to be emphasized that the scope of this invention is not to be limited by this theory.

Silica was initially selected for evaluation as a potential filler because the proposed and subsequently supported coupling theory dictated the need for reactive hydroxyl groups on the surface of the filler and the presence of these groups was shown by the demonstrated coupling of this filler to a polymer matrix through an organosilane coupling agent. However, as shown in Table II, various fillers having reactive hydroxyl groups can be effectively coupled to the polyamide matrix using a subject resole as the coupling agent. Silica, wollastonite ($CaSiO_3$), and glass beads all proved to be suitable filler materials. In comparison, calcium carbonate, magnesium silicate (talc) and graphite provided no significant advantage when compared to a composition containing 40% silica and no coupling agent. This noncoupled composition has a tensile strength of about 8,800 psi.

TABLE II

| Filler Type (1) | Tensile Strength (psi) |
| --- | --- |
| 1. Silica (L207A) (Malvern Co.) | 12,300 |
| 2. Glass Beads (Pottiers Bros. No. 3000) | 10,180 |
| 3. Wollastonite ($CaSiO_3$) | 11,612 |
| 4. Calcium Carbonate | 7,378 |
| 5. Magnesium Silicate | 9,740 |
| 6. Graphite | 8,860 |

(1) The filler concentration in each composition was 40% by weight and 1% by weight, based on the filler, of a resole formed by the reaction of an excess of formaldehyde with equimolar portions of phenol and resorcinol were used in each sample. Each filler was pretreated in accordance with a preferred embodiment of this invention.

Filler materials useful in practice of the subject invention include mineral particles and fibers having reactive hydroxy functionalities on the surface thereof, such as silica in its many forms, various hydroxylated silicates and the like.

A particulate filler shape was selected over a fibrous shape in this investigation because the preliminary goal was to develop a polyamide injection molding composition and the particulate shape presents fewer processing problems than the fiber shape, especially if relatively large filler concentrations are used. However, it is to be understood that the coupling mechanism disclosed herein is not dependent on any particular particle shape and, therefore, the scope of this patent is not to be so limited.

A suitable filler particle size for the practice of this invention may vary over the range of from 0.1 micron to 400 microns. The major limitations on the particle size and shape are imposed by processing requirements. The subject coupling agents are effective over the entire particle size range that is feasible to use in an extrusion or molding grade polyamide resin. Similarly, if fibers are used, as the reinforcing filler, the shape and size are again controlled by the processing requirements. However, as the following description indicates, the maximum physical properties of the subject composition will probably be achieved within a narrower range of particle size and shape.

Variations in the average particle size of a specific silica filler, Novacite, affects both the impact strength and the percent elongation at break of the filled and coupled polyamide composition. Theoretically, by reducing the particle size, the exposed filler surface is increased which would also increase the number of available reactive hydroxyl groups. From this, one would predict that as the particle size decreases the number of coupling sites and, therefore, the strength of the reinforced composition, should initially increase and then approach a maximum. Surprisingly, the data indicates that as the particle size is less than 4 or 5 microns or exceeds 11 or 12 microns, the impact strength of the composition markedly decreases. However, the tensile strength is almost independent of the particle size over the same range. It should be noted that the average particle size was measured as that point on the particle size distribution curve where 50% of the silica would pass through a screen of that particular size.

Some of the physical properties of the subject filled polyamide resins are dependent upon the concentration of the filler. For example, by increasing the concentration of a particulate silica filler from zero to 220 parts by weight per 100 parts of resin the heat deflection temperature (HDT), at 264 psi, increases from about 65° to 185° C.

The subject coupling agent is a prepolymer of phenol (and/or resorcinol) -formaldehyde which is typically described by the following formula in the case of phenol-formaldehyde:

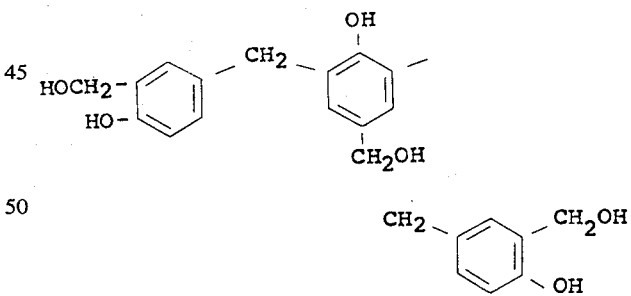

This material is a well known condensation polymerization product which when fully polymerized is a rigid, highly crosslinked thermoset material. However, in the prepolymer stage, which is termed a resole, the molecular weight is relatively low and the material has many properties typical of a thermoplastic resin. For example, the resole is liquid or a solid which will melt upon heating and is soluble or dispersable in solvents such as acetone.

Other resoles suitable for this application may be formed by reacting an excess of formaldehyde with any of a variety of phenolic compounds such as p-phenyl phenol, 2,2'-bis-(hydroxyphenyl) propane, and p-tert butyl phenol.

The resole must have two specific features to be useful in this application. First, the molecular weight or crosslink density must be sufficiently low that the material is soluble in a solvent such as acetone. If the resole is insoluble, there is no convenient method of applying a thin coating of this material to the filler particles. A suitable resole may be a liquid or a solid, but it must be soluble in a suitable solvent such as acetone. Preferably, the resole is a liquid having a viscosity within the range of 200 to 4,000 centistokes, as measured in a solution of 15% alcohol and 85% resole at room temperature. Secondly, the resole must have unreacted hydroxyl functionalities, otherwise it will not react with the reactive hydroxyl groups on the surface of the filler.

This resole is initially prepared by blending one mole of any of (a) phenol, (b) resorcinol, or (c) a mixture of these two materials in any proportions with from 1.01 to 1.5 moles of formaldehyde and then allowing the polymerization of reaction to proceed until the resole acquires the desired viscosity. The excess of formaldehyde promotes the formation of unreacted hydroxyl groups on the resole.

Table III illustrates the effect of varying the resole ingredients on the tensile strength and impact strength of the reinforced nylon 6 composition. More specifically, these figures show that an effective coupling agent can be made by reacting an excess formaldehyde with any of (a) phenol, (b) resorcinol, or (c) a mixture of phenol and resorcinol in any proportions.

A suitable reinforced polyamide molding composition may be formed by first providing a fibrous or particulate hydroxyl group-containing mineral filler, preferably a particulate filler with an average particle size of from 4 to 10 microns, and then pretreating that filler by mixing it thoroughly with from 0.1 to 5 percent by weight, preferably 0.5 percent, of a resole dissolved in acetone. After thoroughly blending and drying these two materials the coated filler is heated to a temperature within a suitable range of from 150° to 220° C., preferably 170° C., for a period of time within the suitable range of from 1 minutes to 60 minutes, preferably 45 minutes, to react the coupling agent with the filler particles. This coated filler is then blended with a polyamide resin, preferably nylon 6, at a concentration within a suitable range of from about 5 to 70 percent by weight, based on the total composition, preferably about 40 percent. The components are then integrally mixed by an extrusion process with a melt temperature of about 265° C. and then granulated.

EXAMPLE 1

This example demonstrates the procedures and results which fall within a preferred embodiment of this invention, and more specifically these results indicate that in the subject composition the filler and the polyamide matrix are effectively coupled together by the resole.

The specific polyamide resin used in this example was a nucleated nylon 6 polycaprolactam polymer marketed by Allied Chemical Corporation under the designation "Plaskon XP607." This resin had an intrinsic viscosity of 1.19 in m-cresol at a temperature of 25° C. corresponding to a molecular weight ($M\overline{w}$) of about 28,500. This is a typical injection molding grade nylon 6 resin.

The finely divided filler used to reinforce the nylon in this example was a particulate silica marketed by Malvern Mineral Company under the trade name "Novacite L207A"; the average particle size was about 4 microns. The average size was defined as the mesh dimension through which 50 percent of the filler would pass.

The resole or phenolic prepolymer used in this example was the condensation reaction product of a solution of phenol and resorcinol at a 1:1 mole ratio, and an excess of formaldehyde. The viscosity of this product was within the range of 200 to 4,000 centistokes as measured in a solution of 15 percent alcohol, commercial grade No. 30 alcohol, and 85 percent prepolymer at a temperature of 25° C. The resole was blended into the filler at the following concentrations - 0.5 percent, 1 percent, 2 percent and 5 percent by weight, based on the filler.

In preparing the reinforced compositions, the first step was to predry the fillers by heating them to 180° C. and holding them at that temperature overnight. This precaution was taken to eliminate the possibility of water or other volatile impurities distorting the experimental results. This precaution was taken with each of the following examples.

Prior to blending with the filler, the resole was dissolved in acetone, at a weight ratio of about 2.25 parts

TABLE III

THE EFFECT OF USING VARIOUS PHENOLIC RESINS AS COUPLING AGENTS IN NOVACITE SILICA L207A:NYLON 6 COMPOSITES

| Phenolic Resin Type | % Applied to Filler | Unnotched Izod Impact Strength (ft.-lbs.) | Tensile Strength (psi) | Tensile Strength As % of the Tensile Strength of Pure Nylon 6 |
|---|---|---|---|---|
| Phenol: | 0.5 | 7.8 | 11,600 | 102 |
| Formaldehyde | 1.0 | 7.3 | 12,300 | 108 |
|  | 2.0 | 5.2 | 12,300 | 108 |
|  | 5.0 | 4.0 | 11,000 | 96 |
| Phenol:Resorcinol | 0.5 | 5.0 | 11,250 | 98.6 |
| (1:1 Mole Ratio): | 1.0 | 5.6 | 11,000 | 96 |
| Formaldehyde | 2.0 | 5.2 | 11,600 | 102 |
|  | 5.0 | 4.9 | 11,600 | 102 |
| Resorcinol: | 0.5 | 7.5 | 10,500 | 92 |
| Formaldehyde | 1.0 | 6.7 | 11,528 | 102 |
|  | 2.0 | 5.8 | 11,520 | 101 |
| No Coupling Agent | — | 4.0 | 8,800 | 76 | of resole to 30 parts of acetone. Then the acetone-resole solution was vigorously blended with the filler in the proportions which would yield the desired resole to filler ratio. Dissolving the resole in acetone was a convenient method to insure a uniform dispersion of the prepolymer in the filler, by wetting the filler surface to insure intimate contact between the filler and the prepolymer. A minimum of acetone was used. The actual mixing of the solution and the filler was done in a Henschel mixer. After stirring the filler-solution mixture for about 15 minutes, the mixture was dried and baked for 45 minutes at about 170° C.

The blending procedure, in effect, coated the filler particles with a thin layer of the resole and the subsequent baking or curing step continued the polymerization of the resole and, more importantly, provided the driving force for the condensation reaction between the reactive hydroxyl functionalities on the surface of the filler and the unreacted hydroxyl groups on the resole. This condensation reaction formed the chemical bond between the filler and the resole.

The next step in compounding the subject filled and reinforced polyamide resin was to uniformly and thoroughly disperse the filler in the resin matrix. In this example, 40 parts by weight of the pretreated filler were blended with 60 parts by weight of resin. The initial blending was carried out in a Henschel mixer for about two to three minutes. Then the filler-resin mixture was passed through a 1½ inch Sterling extruder having a single stage screw with L/D ratio of 30:1. The optimum barrel temperatures were found to be 310° C. at the feed section and 290° C. at all other zones, which produced a melt temperature of about 265° C. The filler resin was passed through this extruder twice to thoroughly mix the fill and the resin, and then the extrudate was granulated to form a suitable molding compound. Standard ASTM test samples were then injection molded to evaluate the physical properties of the compound.

The tensile strength and the unnotched impact strength of the compositions having 0.5 percent, 1 percent, 2 percent and 5 percent by weight, based on the filler, of the resole coupling agent produced in accordance with the procedures described in this example, are listed in Table IV. The control was identical to the test sample except that the resole was omitted.

TABLE IV

| % Resole | Impact Strength (ft./lbs.) | Tensile Strength (psi) |
|---|---|---|
| 0.5 | 5.0 | 11,250 |
| 1 | 5.6 | 11,000 |
| 2 | 5.2 | 11,600 |
| 5 | 4.9 | 11,600 |
| Control | 4.0 | 8,800 |

These results clearly illustrate the utility of the subject composition. Furthermore, when these properties are compared to the reinforced nylon 6 resins employing the aminosilane coupling agents and the relative costs of the silanes and the phenolics, it is apparent that similar results are achieved with a considerable cost savings.

EXAMPLE 2

This example demonstrates that a variety of resoles may be used as the coupling agent in the subject reinforced polyamide composition. The general class of resoles which may be used in the subject composition may be defined as the reaction product of an excess of formaldehyde and any of phenol, resorcinol, or a mixture of these two in any proportion.

To illustrate that all members of the specified class are effective, the following samples were prepared in accordance with the procedures described in Example 1. All parameters except the resole ingredients, were held constant. Samples containing 0.5 percent, 1 percent, 2 percent and 5 percent of each of three resoles were prepared and evaluated.

The resole used in sample no. 1 was the condensation reaction product of phenol and formaldehyde. The molding composition contained 40 percent by weight, based on the total composition, of a particulate silica filler marketed by Malvern Mineral Company under the designation "Novacite L207A"; the average particle size was about four microns. The polyamide was a nylon 6 resin marketed by Allied Chemical Company under the designation "Plaskon XP 607"; this polymer has a molecular weight ($M\overline{w}$) of about 29,000. This is a typical nylon 6 molding compound. The physical properties of samples molded from this composition are listed above in Table III.

The resole used in sample no. 2 was the condensation reaction product of an excess of formaldehyde and a mixture of equal parts of phenol and resorcinol. This material is marketed by Ironsides Company under the designation "DP25-10C." The molding composition was prepared using the procedures described in Example 1 and the physical properties of test samples molded therefrom are also listed in Table III.

The resole used in sample no. 3 was the condensation reaction product of formaldehyde and resorcinol. This material is marketed by the Koppers Company under the designation "R-2170." Again, the preparation procedures described in Example 1 were used and the physical properties of test samples molded from this composition are also listed in Table III.

When the properties of the compositions containing the resole are compared to the sample which contained no coupling agent, it is apparent that all three resoles are effective in increasing the impact and tensile strengths of the 40 percent filled nylon 6 compositions. Furthermore, when this data is compared to the data in Table I, it is apparent that these prepolymer coupling agents are as effective as the silane coupling agents.

EXAMPLE 3

This example illustrates the effect of the filler particle size on the physical properties of the subject molding composition.

The reinforced polyamide compositions used in this example were prepared in accordance with the procedures detailed in Example 1. Specifically, this composition contained 40 percent by weight, based on the composition, of a particulate silica filler, Novacite 207A, and the polyamide was a nylon 6, Plaskon XP607. The resole coupling agent was the reaction product of an excess of formaldehyde and a mixture of equal mole parts of the phenol and formaldehyde. This resole is marketed by Ironsides Company under the designation "DP25-10C."

Surprisingly, this data shows a maximum impact strength of about 8 ft.-lbs. at a particle size within the range of 5 to 7 microns, and a decrease of almost 40 percent if the particle size exceeds 10 microns or is less than 5 microns. In contrast to the dependence of the impact strength on the average particle size of the filler, the tensile strength is practically independent of this parameter over the same range.

Typically, 0.5 percent by weight, based on the filler, of the resole was used in this example; however, when the unnotched impact strength unexpectedly decreased sharply when the average particle size was less than 4 microns, compositions containing 1 percent and 2 percent were also tested. However, the increase in the resole concentration did not alter the impact strength of the composition.

EXAMPLE 4

The heat deflection temperature (HDT) is a standard method, ASTM D-648, of evaluating the ability of a molding composition to bear loads at elevated temperatures. This test is performed by horizontally suspending a test sample and subjecting it to a specific stress, usually 264 psi. The temperature is slowly raised until the sample deflects a given distance. The temperature at which this occurs is then reported as the heat deflection temperature (HDT).

Inorganic fillers are often added to polymers to increase their HDT, and this example illustrates the effect of varying the filler concentration on the HDT of the subject polyamide compositions which employ the subject resole as the coupling agent.

The formulations used in this example were prepared according to the procedures outlined in Example 1. Specifically, the compositions evaluated in this example contained from zero to 70 percent by weight, based on the total composition of a particulate silica filler, L207A, marketed by Malvern Mineral Company, and 1 percent by weight, based on the filler, of a resole marketed by Ironsides Company under the designation "DP25-10C." Over the specified range of filler concentration, the HDT increased in a near linear fashion from about 65° C. to about 185° C.

EXAMPLE 5

Wollastonite ($CaSiO_3$), Minusil silica, which has an average particle size of about 30 microns, and glass beads having an average size of 30 microns were also successfully employed as fillers in the subject resole coupled compositions. These compositions were prepared according to the procedures described in Example 1, and the data shown above in Table II clearly shows an effectively coupled and reinforced material is achieved with any of the above three fillers. Each of these compositions contained 40 percent by weight of the specific filler and 1 percent by weight, based on the filler, of a resole marketed by the Ironsides Company under the trade designation "DP25-10C." This particular resole is formed by the reaction of formaldehyde with a mixture of equal mole parts of phenol and resorcinol.

While our invention has been described in terms of certain specific examples, it will be appreciated that other forms thereof could readily be adopted by one skilled in the art. Therefore, the scope of our invention is not to be limited to the specific embodiments illustrated.

What is claimed is:

1. A reinforced polyamide composition comprising, by weight, 100 parts of a polyamide resin and from 5 to 220 parts of a finely divided filler dispersed therethrough, said filler being characterized by reactive surface hydroxyl groups, the particles of said filler having an average particle size in the range of from 0.1 to 400 microns and being coated with from 0.1 to 5 percent by weight, based on said filler, of a resole soluble in acetone, said resole being chemically combined with the underlying filler particles by reactions with said hydroxyl groups.

2. A reinforced polycaprolactam molding composition comprising, by weight, 100 parts of a polycaprolactam resin and from 5 to about 220 parts of a particulate filler dispersed therethrough, said filler particles having an average particle size in the range of from 0.1 to 400 microns and having reactive hydroxyl groups on the surfaces thereof, the particles of said filler being coated with from 0.1 to 5 percent by weight, based on said filler, of a resole soluble in acetone, said resole being the reaction product of a material taken from the group consisting of phenol and resorcinol with an excess of formaldehyde, said resole being chemically combined with the underlying filler particles by reaction with said hdyroxyl groups.

3. A reinforced polycaprolactam molding composition comprising, by weight, 100 parts of a polycaprolactam resin and from 5 to 220 parts of particulate silica dispersed therethrough, said silica having an average particle size of about 4 to 10 microns, said silica particles being coated with from 0.1 to 5 percent by weight, based on said filler, of a resole soluble in acetone, said resole being chemically combined with said silica particles by reaction with hydroxyl groups on the surface of said silica particles.

4. A high impact strength reinforced nylon 6 molding composition comprising, by weight, 100 parts of a nylon 6 resin and from 100 to 220 parts of a particulate silica filler dispersed therethrough, said filler particles having an average size of from 5 to 7 microns and having reactive hydroxyl groups on the surfaces thereof, the particles of said filler being coated with from 0.3 to 2 percent by weight, based on said filler, of a resole, said resole being soluble in acetone and being chemically combined with the underlying filler particles.

5. A method of forming a filled and reinforced polyamide composition, comprising: and
   a. providing 100 parts, by weight, of a polyamide resin,
   b. providing from 5 to 220 parts of a finely divided mineral filler having an average particle size in the range of from 0.1 to 400 microns and having reactive hydroxyl functionalities on its surfaces,
   c. thoroughly mixing and uniformly coating said filler with from 0.1 to 5 percent, by weight based on said filler, of a resole,
   d. baking the resole coated filler at a temperature in the range of 150°C to 220°C for a time period in the range of from 30 to 60 minutes to react said resole with said hydroxyl functionalities on the surfaces of said filler,
   e. thoroughly blending said resin and said resole coated filler, and
   f. extruding and chopping the blend to mix said resin and said filler at extrusion temperatures and to form a filled molding compound.

* * * * *